UNITED STATES PATENT OFFICE.

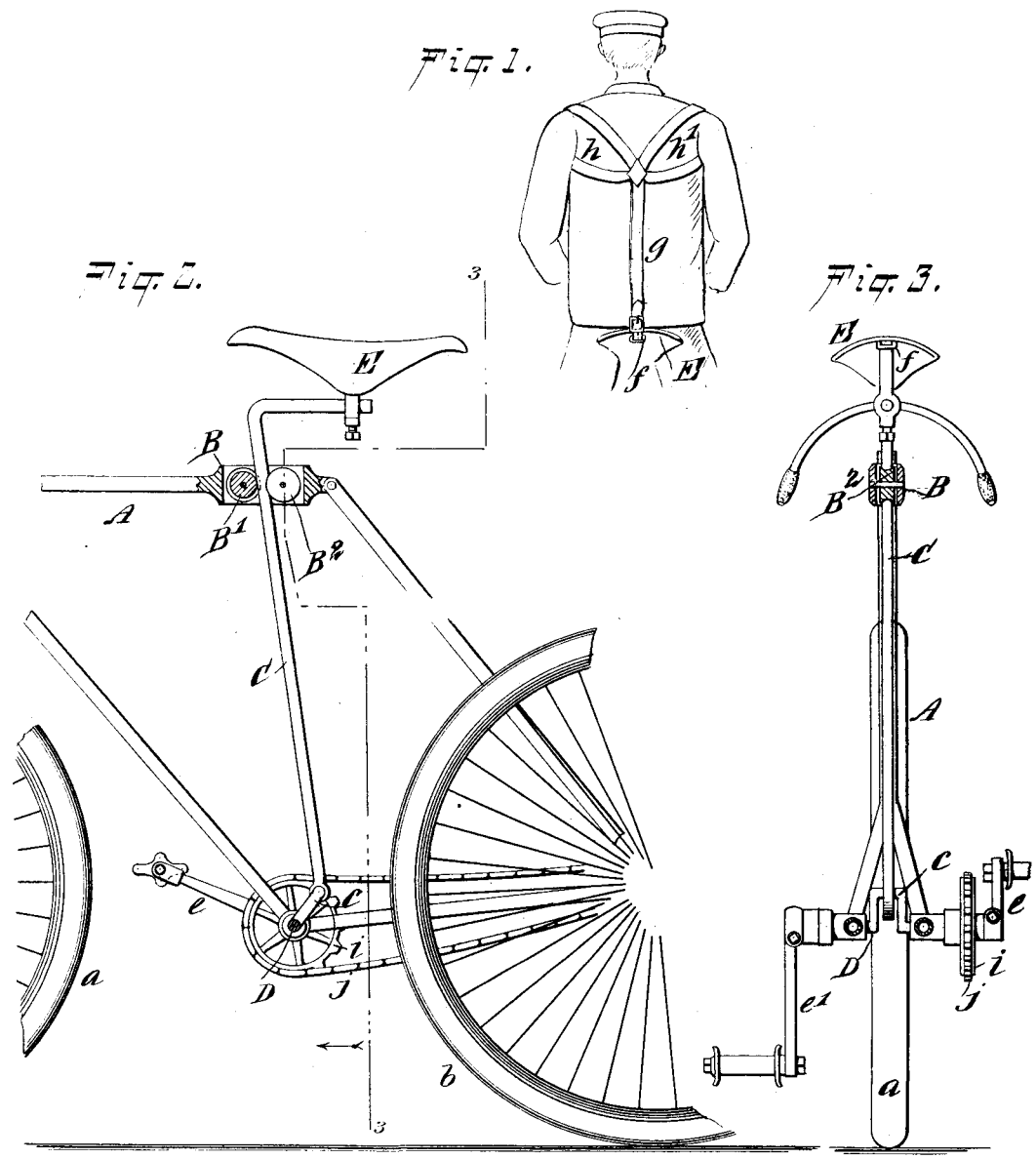

NELSON MERRILL, OF ALTAMONT, NEW YORK.

TRICYCLE OR BICYCLE.

SPECIFICATION forming part of Letters Patent No. 579,002, dated March 16, 1897.

Application filed September 5, 1895. Serial No. 561,488. (No model.)

*To all whom it may concern:*

Be it known that I, NELSON MERRILL, of Altamont, in the county of Albany and State of New York, have invented new and useful Improvements in Tricycles or Bicycles, of which the following is a full, clear, and exact description.

The object of my invention is to construct a tricycle or bicycle in which the weight of the rider may be utilized in propulsion in addition to the pressure produced by the feet, so as to augment the total propelling power to facilitate the ascent of grades, and also to give the body of the rider a movement similar to that of a pedestrian.

The invention consists in the combination, with the saddle having a vertically-sliding standard whose lower end is secured to a crank on the pedal-shaft, of a shoulder-strap for creating an upward pull on the seat when desired and for supporting the back of the rider and to hold him to the seat when he is in an erect position, all as hereinafter more fully described and claimed.

Reference is to be had to the accompanying drawings, forming a part of this specification, in which similar characters of reference indicate corresponding parts in all the figures.

Figure 1 is a rear view of the rider, showing the application of the shoulder-strap. Fig. 2 is a partial side elevation showing the auxiliary crank and its connection with the saddle, and Fig. 3 is a vertical transverse section taken on the line 3 3 in Fig. 2.

Although my improvement applies to all forms of foot-propelled vehicles and to local power or driving mechanism, I will describe it as applied to a bicycle.

The diamond frame A is supported by two wheels $a$ $b$ in the usual manner, and in the upper part of the frame is formed a boxing B, in which guide-wheels $B'$ $B^2$ are trunnioned and between which the saddle-standard C may move freely up and down. The rollers are grooved, and it is obvious that as the standard moves up and down a fore-and-aft motion will be imparted to the saddle. In the lower part of the frame A is journaled the pedal-shaft D, having formed in the center thereof a short crank $c$, which is connected with the lower end of the saddle-standard C.

On the ends of the pedal-shaft D are secured the usual pedal-cranks $e$ $e'$, which are arranged at an angle of one hundred and twenty degrees with each other and at the same angle with the crank $c$.

To the rear of the saddle E is attached a loop $f$, to which is attached a strap $g$, which extends upward along the back of the rider and is connected at its upper end with two loops $h$ $h'$, which extend around the rider's shoulders, as shown, so that when the rider presses down upon the foot-pedals and thus raises his body the strap $g$ will tend to raise the saddle and thus cause an upward pull on the crank $c$. While the pedals are rising, the crank $c$ makes its downward movement, and at this time the weight of the body is allowed to bear fully upon the saddle and is transferred to the crank $c$.

The shaft D is provided with the usual sprocket-wheel $i$, which transmits motion by means of the chain $j$ to a sprocket-wheel on the shaft of the rear wheel of the bicycle.

Having thus described my invention, I claim as new and desire to secure by Letters Patent—

In a bicycle or tricycle, the combination with the pedal-shaft having an intermediate crank, of a vertically-sliding saddle-supporting standard having its lower end secured to the said intermediate crank, and shoulder-straps secured to the saddle and adapted to be secured to the rider, whereby an upward pull will be exerted upon the said crank when the rider presses down upon the pedals, substantially as described.

NELSON MERRILL.

Witnesses:
 MARION LEWIS,
 WM. F. BRIDGH.